J. CARTER.
AUTOMOBILE STEERING DEVICE.
APPLICATION FILED OCT. 7, 1907.

913,198.

Patented Feb. 23, 1909.
2 SHEETS—SHEET 1.

Witnesses
C. C. Smith.
E. B. McBath.

Inventor
Jonathan Carter
By O'Meara & Brock
Attorney

J. CARTER.
AUTOMOBILE STEERING DEVICE.
APPLICATION FILED OCT. 7, 1907.

913,198.

Patented Feb. 23, 1909.
2 SHEETS—SHEET 2.

Witnesses
C. E. Smith.
E. B. McBath.

Inventor
Jonathan Carter,
By O'Meara & Broch
Attorneys

UNITED STATES PATENT OFFICE.

JONATHAN CARTER, OF NORWALK, CALIFORNIA.

AUTOMOBILE STEERING DEVICE.

No. 913,198.　　　Specification of Letters Patent.　　　Patented Feb. 23, 1909.

Application filed October 7, 1907. Serial No. 396,258.

*To all whom it may concern:*

Be it known that I, JONATHAN CARTER, a citizen of the United States, residing at Norwalk, in the county of Los Angeles and State of California, have invented a new and useful Improvement in Automobile Steering Devices, of which the following is a specification.

This invention relates to a steering device for automobiles and the object of the invention is a device of this kind in which there is no lost motion through looseness of any of the parts or through the wear of gear wheels.

The invention consists in the novel features of construction hereinafter described, pointed out in the claims and shown in the accompanying drawings, in which—

Figure 1:
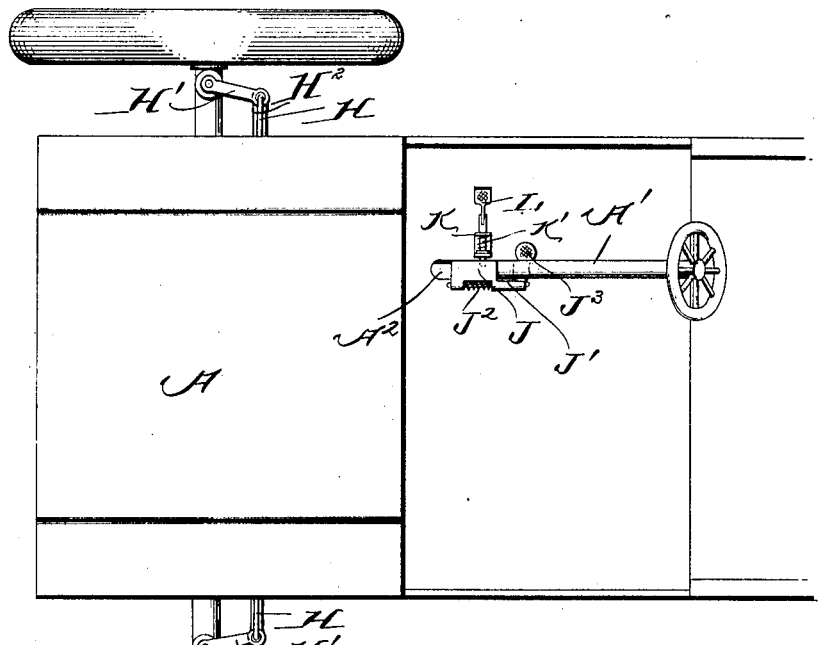
Figure 2:
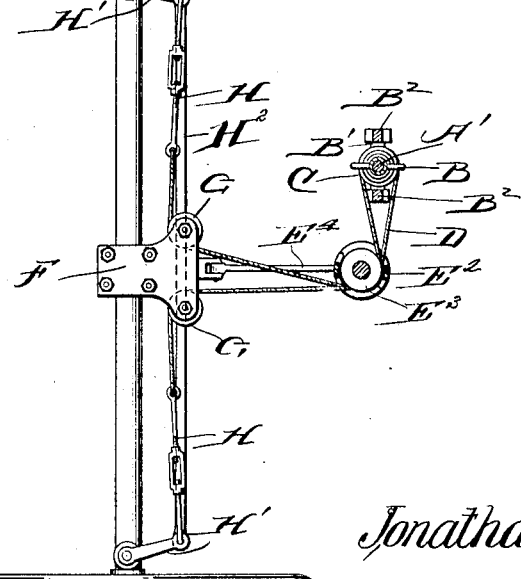
Figure 3:
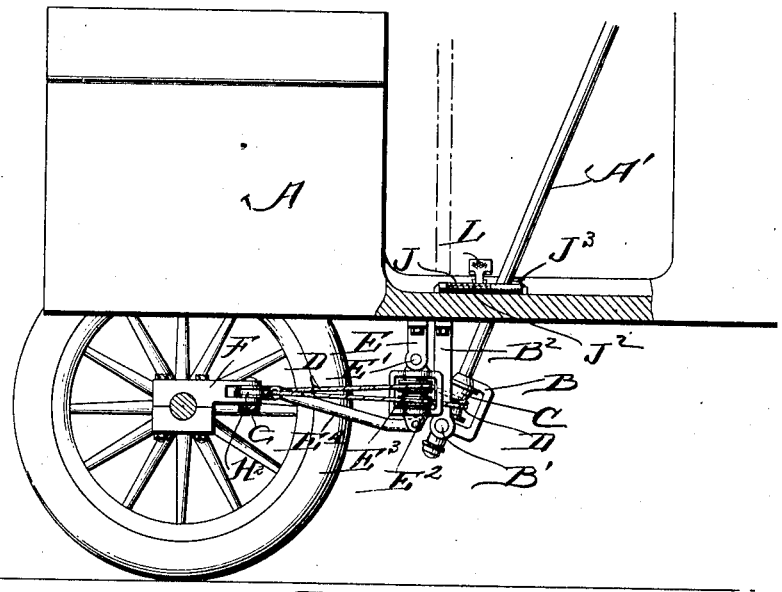
Figure 4:
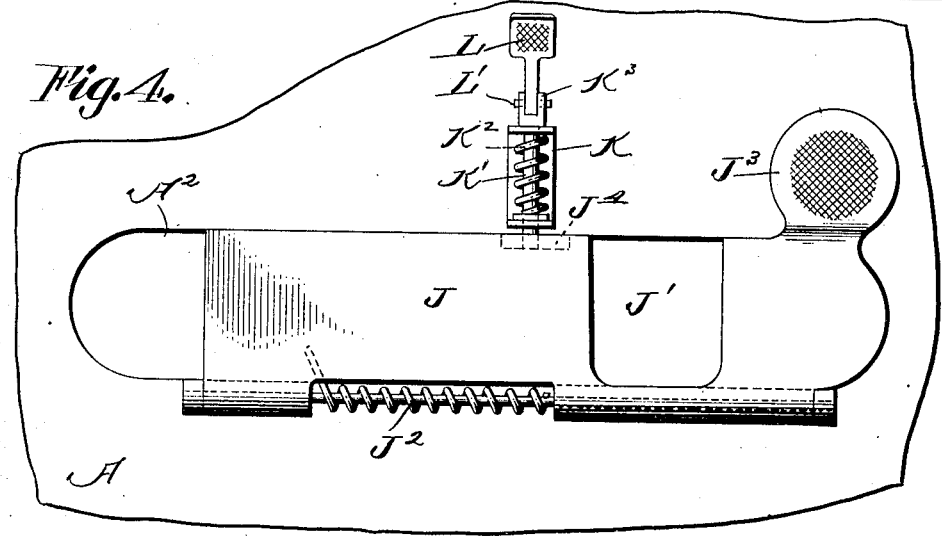
Figure 5:
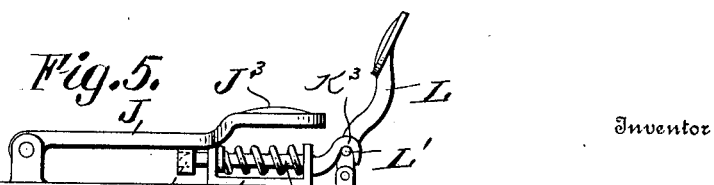

Figure 1 is a plan view of a portion of an automobile showing the steering wheel in operative position; Fig. 2 is a sectional view showing the front axle and a portion of the steering mechanism in plan; Fig. 3 is a side elevation of the front portion of an automobile, the parts being shown in section; Fig. 4 is an enlarged detail view of a steering bar locking plate, the steering rod being removed; Fig. 5 is an end view of the plate shown in Fig. 4.

In these drawings, A represents in outline a portion of the body of an automobile provided with a steering wheel and rod A', which passes downwardly through a slot $A^2$ in the bottom of the vehicle body. The lower end portion of the steering rod is journaled in a swinging bracket B, which bracket is provided with a pivot pin B' rotatively journaled in a bracket $B^2$. Upon the steering rod and within the bracket B is fixed a drum C upon which is wound an intermediate portion of a cable D. From the drum C the members of the cable are carried to sheaves $E^3$ which are mounted within an open housing $E^2$ swung by a pivot pin E' from a bracket E. It will be understood that both the brackets $B^2$ and E are in the form of suitable hangers bolted beneath the body of the automobile and to the rear of the front axle. Upon the front axle is mounted a combination boxing and sheave plate F which extends rearwardly and provides bearings for two sheaves G over which the members of the cable D pass from the double swinging sheave $E^3$. The housing $E^2$ is steadied by a truss-rod $E^4$ pivotally connected respectively to the said housing and to the sheave plate F to allow free movement of the housing $E^2$. Cables D are connected by suitable metal links H to steering knuckles H' of the usual kind. The knuckles H' are connected by the usual connecting bar $H^2$, now in common use. The opening $A^2$ is partially closed by a hinged plate J which covers a portion of said opening and the plate J is cut out adjacent one end as shown at J', and is held in open position by a spring $J^2$ coiled around the hinged pintle. The plate J also carries a projecting raised foot portion $J^3$ and by pressure upon this portion the plate may be returned to its normal position. To hold the plate J closed it is provided with a socket $J^4$ upon its front edge, which is normally engaged by a locking bolt K' working through a bracket K and forced into engagement with the socket by a spring $K^2$. The rear end portion of the bolt K' is bifurcated and formed into a hook $K^3$ and a foot lever L is pivoted adjacent the bracket K and passes through the bifurcation of the bolt and carries a transversely arranged pin L' engaged by the hooks $K^3$ of the bolt K'.

It will be obvious that when the steering wheel is in use the rod A' projects upwardly through the slot $A^2$ and through the cut out portion J' of the plate J, longitudinal movement along the slot being prevented by the plate J. When it is desired to leave the machine, the lever L is pressed down by the foot, withdrawing the bolt K' from the socket $J^4$ and the spring $J^2$ lifts the plate J and the steering rod can then be thrown to the forward end of the slot $A^2$. Pressure upon the foot portion $J^3$ returns the plate J to its normal position in which it is locked by reëngagement of the bolt K' with the socket $J^4$, thus locking the steering rod at the forward end of the slot.

It will also be obvious that by rotating the steering rod the cable D will wind and unwind upon the drum C, thus moving the steering knuckles H' in the desired direction, depending upon the direction of rotation of the steering wheel, and it will also be obvious that by mounting the drum D and the sheaves $E^3$ in swinging supports carried by brackets, full allowance is made for all swinging of the machine.

Having thus described my invention what I claim and desire to secure by Letters Patent is—

1. A steering device for automobiles comprising steering knuckles, a sheave plate carried by the front axle, a double sheave pivotally supported from beneath the body of the vehicle, a steering rod, swinging bearings for said rod, a drum arranged upon the lower portion of the rod, sheaves carried by the sheave plate, and a cable winding upon the drum, the members of the cable running over the double sheave and passing respectively over the sheaves of the sheave plate and being connected to the steering knuckles.

2. In an automobile steering device, a sheave plate carried by the front axle, sheaves carried by said plate, a bracket, a housing pivotally suspended from said bracket, a double sheave in said housing, a truss-rod pivotally connected to the sheave plate and to the housing, steering knuckles, a rotatable steering rod, a drum upon said rod, and a cable wound upon said drum and having its end portions running respectively over the double sheave and over the sheaves of the sheave plate and connected to said steering knuckles.

3. The combination with an automobile having a slotted body portion, of a steering rod extending through and movable along said slot, a hinged plate covering a portion of said slot, said plate being cut out, a spring adapted to hold the plate in open position, a spring pressed bolt engaging and locking the plate when in closed position, a foot portion carried by the plate, and a foot lever for withdrawing the bolt from said plate.

JONATHAN CARTER.

Witnesses:
PETER R. CARTER,
E. P. TRUITT.